Aug. 18, 1970     S. M. COPLEY ET AL     3,524,636
CAST SINGLE CRYSTAL SPRING ELEMENT
Filed March 20, 1968
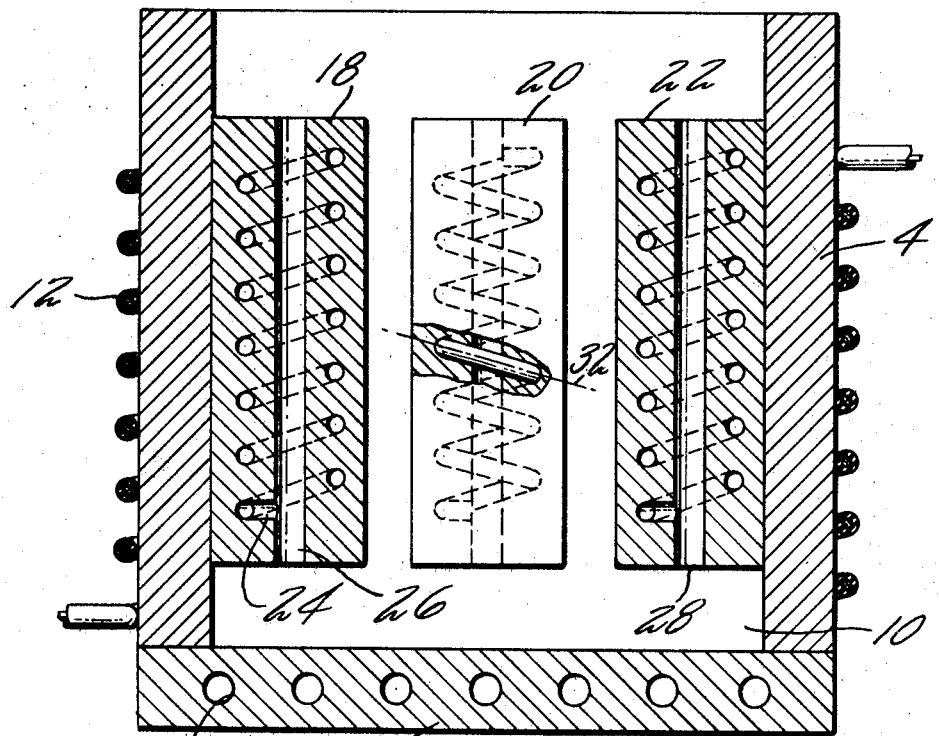
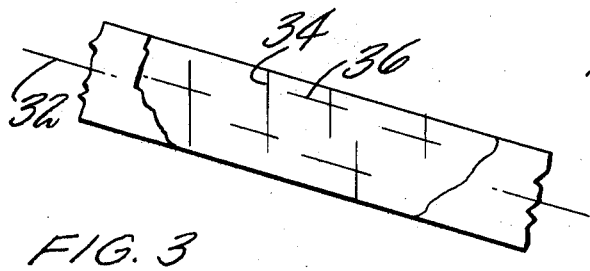
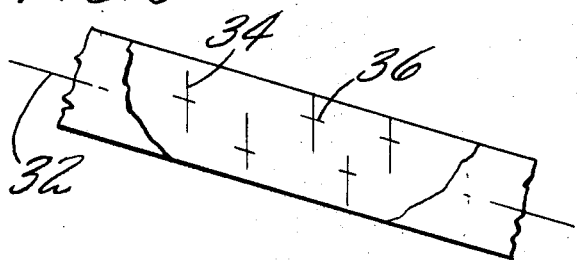
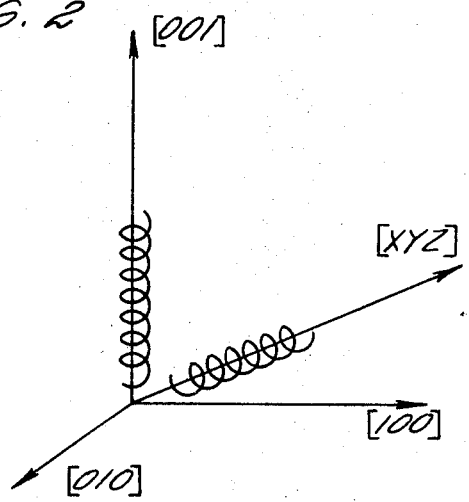
INVENTORS
STEPHEN M. COPLEY
DAVID N. DUHL
BERNARD H. KEAR

United States Patent Office 3,524,636
Patented Aug. 18, 1970

3,524,636
CAST SINGLE CRYSTAL SPRING ELEMENT
Stephen M. Copley, Madison, David N. Duhl, Newington, and Bernard H. Kear, Madison, Conn., assignors to United Aircraft Corporation, East Hartford, Conn., a corporation of Delaware
Filed Mar. 20, 1968, Ser. No. 714,721
Int. Cl. F16f 1/02
U.S. Cl. 267—166      15 Claims

ABSTRACT OF THE DISCLOSURE

A new article of manufacture comprising a cast spring element capable of operating at high temperatures, the spring element having a predetermined crystallographic orientation with respect to the principal stress or load axis of the spring.

BACKGROUND OF THE INVENTION

This invention relates to a new article of manufacture comprising a spring element cast into a single crystal form.

Resilient elements for use in jet engines, rockets, aircraft wheel brakes, nuclear reactors, steam plants and a host of other applications are called on to sustain, elastically, stresses at elevated temperatures with little or no creep or stress relaxation. As the ambient temperatures increase, the problem becomes increasingly difficult. The spring is basically a resilient element designed to deliver a force over a distance. Because of space limitations, it is usually designed with as high an elastic stress as possible. Its loading is almost always unidirectional. It is well known that currently used spring elements fail by setting or plastic deformation at high temperatures. The resilience of such springs at low and intermediate temperatures is due to a dense dislocation substructure developed in the spring material during drawing and coiling operations. Exposure of the spring to high temperatures leads to recovery and recrystallization of the spring material with a loss in high temperature resilience. Furthermore, a spring exposed to high temperatures, exhibits a subsequent reduction in resilience at low temperatures. Setting or plastic flow results from slip or dislocation motion within the grains, and sliding of grains along their grain boundaries. If this setting occurs under constant load conditions, it is called creep. Under fixed height conditions, setting is called relaxation.

Heretofore conventional or currently used springs have been unable to sustain their creep characteristics under elevated temperature conditions. As a result of this inability to use conventional springs in environments of high temperatures, the resulting configurations have to be made unduly complex to permit use of a spring element.

Further, while there are materials which will sustain high temperatures, these materials have been found to be unworkable, that is, they have been found to be unable to be manufactured into a spring with acceptable characteristics. It is not normal practice in the spring industry to manufacture springs by casting. Even if springs were cast by conventional casting techniques, a disadvantage of manufacturing spring elements by these techniques would be that the resulting cast part contains grain boundaries. It has been found that these grain boundaries at elevated temperatures contribute significantly to plastic deformation of the part through grain boundary sliding.

The present invention herein described provides a spring element which is capable of operating at elevated temperatures while maintaining favorable creep and relaxation characteristics.

SUMMARY OF THE INVENTION

It is a primary object of this invention to provide a new article of manufacture comprising a cast spring element capable of operating at elevated temperatures, the spring element having a predetermined crystallographic orientation with respect to the principal stress axis of the spring element.

The new article of manufacture of the present invention is comprised of a single crystal of metal and may be formed in either of two ways. It may be formed by directionally solidifying a molten metal and forming a single crystal block therefrom, and thereafter, machining out the spring element; or it may be cast directly in a spring-shaped mold using directional solidification methods. As hereinbefore noted, materials which have desirable high temperature characteristics are available for use in a spring. However, a major problem in providing, from these materials, a spring element of the type herein described is that these materials cannot be fabricated into a spring element by conventional spring manufacturing practice. The present invention, by using materials of high temperature characteristics, and which are amenable to casting into a single crystal, avoid the foregoing problems.

Another advantage of the present invention is that by forming the spring element in single crystal form, elimination of grain boundaries is accomplished. This elimination of grain boundaries removes the possibility of grain boundary sliding and hence provides a spring element having highly desirable characteristics.

The present invention is equally adaptable to both single and multiphase structures. It is well known that in the solid state a metal is a crystallographic material with its atoms arranged in a specific lattice structure. A common structure, and one which is a preferred embodiment of the present invention, is the face-centered cubic structure common to nickel base alloys. In this structure atoms are arranged at the corners of the cube and at the centers of the six-cube faces. A macroscopic single crystal is therefore simply a large number of these cubes stacked together, the cube faces being called the [100] planes and the cube edges the <100> directions. It has been found that it is easier to deform the metal lattice in one direction than in another, this meaning that the mechanical properties are a function of the orientation of the crystallographic axis. Consequently, it has been found that the mechanical properties of the cast spring element vary with the crystallographic orientation of the material. Based on this discovery, it becomes clear that to provide a spring element which has the most desirable creep characteristics, the orientation of the single crystal should be selected to minimize plastic deformation. The orientation with a <100> direction parallel to the principal spring axis has been found to be a preferred axis. Likewise, it becomes clear that in other applications where the loading may not be the principal concern the axis of orientation on the single crystal may be formed along the axis of the spring element or along the central axis of the spring element.

Additionally, a single crystal spring, when compared to a polycrystalline spring of similar geometry and substantially the same dimensions which is produced by standard techniques, is a much stronger spring. This results from the fact that the material used in producing a spring of the present invention, because of high temperature alloys employed, has a much lower shear modulus. In other words, a single crystal spring, when compared to a spring of exact geometry which is produced by standard casting techniques has a much lower force-displacement curve.

Finally, it is to be understood that the present invention may be formed into any shape spring element. However, a helix shape is a preferred embodiment. It has been found that a helix spring element cast of single crystal metal has been able to withstand and maintain its operating characteristics up to a temperature of at least 1400° F.

BRIEF DESCRIPTION OF THE DRAWINGS

FIG. 1 is a vertical section of a mold construction for use with the present invention.

FIG. 2 is a pictorial representation of a three orthogonal axis representing crystal orientation.

FIG. 3 is a fragmentary schematic view showing a spring element directly grown by a single crystal process.

FIG. 4 is a fragmentary schematic view showing a spring element which has been machined from a cast single crystal cylinder.

DESCRIPTION OF THE PREFERRED EMBODIMENT

Referring now in detail to the present embodiment of the invention, FIG. 1 illustrates a mold construction which is particularly suited for use with any of the so-called super-alloys as described, for example, in the VerSnyder U.S. Pat. No. 3,260,505, and having the same assignee as this application. As therein noted, these alloys are generally adapted to the process known as directional solidification. The mold construction herein described, in addition to the disclosure contained in the VerSnyder patent, employs the technique of forming Monocrystaloys$_{TM}$ as described in the Piercey Pat. 3,494,709.

The construction herein illustrated consists of a mold 4 placed on a relatively cool heat conductive and preferably water cooled plate 6. Mold 4 is preferably made from a ceramic material from a conventional slurry of alumina or other high melting point refractory material in accordance with standard shell-molding techniques. Water for chill plate 6 is carried through conduits 8. As shown, one end of mold 4 rests on chill plate 6 and cooperates therewith to form an enclosed molding cavity 10. The end of mold 4 opposite chill plate 6 is open to receive molten metal.

Surrounding mold 4 are the means for heating the mold to the desired temperature for casting. Preferably the mold is surrounded by an induction coil 12 supplied with electric current as is usual in a high frequency induction furnace. Prior to casting, the mold is heated to a desired temperature by supplying current to coil 12, and when the desired temperature has been attained, molten metal heated to the proper temperature for casting is poured into cavity 10. The chill plate 6 is maintained at a relatively cool temperature by means of water circulating through conduits 8 so as to establish a temperature gradient with the molten metal filling mold 4 as the metal solidifies.

It is to be understood that the term metal as used herein is to encompass both the pure metal and its alloys. As described herein a preferred metal is an alloy which has as its base nickel or cobalt.

In the present embodiment preformed spring molds 18, 20 and 22 are inserted in mold 4. Preformed spring molds 18, 20 and 22 are preferably made of a refractory material, and each contains a helical cavity as at 24. Each hollow cavity 24 contains a hollow core as shown at 26. This helical cavity 24 may be formed by any conventional process, the lost wax process being a typical means. Each of these helical cavities 24, which is effectively the helical spring mold, has a small opening 28. This opening 28 is illustrated to be at the bottom of each helical cavity 24, and it is clearly shown that the opening 28 is to be spaced above chill plate 6. Now, after the metal has been poured into mold 4, the metal begins to solidify and it has a controlled cube oriented columnar grain structure, and, by providing a small opening such as 28 for each of the helical cavities 24, single crystal growth is promoted therewithin. The growth within the cavities is preferably along the [100] crystallographic direction, as illustrated in FIG. 2, the axis being parallel to the principal axis of the spring formed in the molds 18, 20 and 22. More specifically, referring to FIG. 2, three orthogonal <100> axis are used to represent crystal orientation. As shown in one instance, the central major axis at a helical spring is aligned on the [001] direction of the crystal. An alternative configuration is to orient the major spring axis in some general direction designated by [XYZ]. The construction herein has been shown to have an orientation based on the major spring axis; however, this is the preferred axis and is used herein for illustrative purposes.

As hereinbefore noted, spring elements of any shape can be formed by varying the shape of cavities 24 within the preformed molds 18, 20 and 22. It has also been noted hereinbefore that the mechanical properties of the spring element will vary with the orientation of the crystallographic material, Therefore, it is clear that by controlling the position of the preformed molds 18, 20 and 22 with respect to the chill plate 6, the axis of orientation of the cast spring element can be varied and controlled. More specifically, the crystallographic orientation may be made to be either parallel to the principal stress axis of the spring element, it may be made to be substantially parallel to the spring axis of the spring element as indicated at 32, or it may be made to be substantially parallel to the helix of the spring element. The crystallographic orientation is determined by the particular aplication of the spring element.

FIG. 3 illustrates a portion of a spring element which has been cast using the aforementioned mold construction. The figure clearly shows the condition and position of dendrites 34 and 36 and their crystallographic orientation.

In contrast to casting a spring element directly, as hereinbefore described, it is possible to cast a single crystal block or cylinder and machine the spring element therefrom. A portion of such a spring element is illustrated in FIG. 4. It is pointed out that when a spring is cast into a helical mold, dendrities 34 will have side arms 36, this resulting from the constantly changing growth of a helix. While a spring machined from a single crystal cylinder also has side arms 36, these side arms will be very small as the growth direction is constant during the growth of the cylinder.

The following examples are provided to further illustrate the present invention:

EXAMPLE I

Two springs, one a polycrystalline spring manufactured by conventional techniques from Inconel X material, and a second spring cast as a spring crystal from Mar–M–200 were compared. Typically the nominal composition of Inconel X is 15.5 Cr, 2.5 Ti, .7 Al, .08 C, 7 Fe, 1 Cb and the balance being Ni. The nominal composition of Mar–M–200 is 9 Cr, 10 Co, 2 Ti, 5 Al, .15 C, 12.5 W, and the balance being Ni. Each spring was identical geometrically and subjected to identical temperatures and load conditions. The results were as follows:

| Length | Load applied (lbs.) | Test results |
| --- | --- | --- |
| Inconel X | 3⅞ | 10 Spring began to creep before temperature of 1,200° F. was reached. |
| Mar–M–200 single crystal spring. | 3⅛ | 10 No creep at 1,200° F. Spring did not begin to creep until temperature reached 1,400° F. |

EXAMPLE II

The following analysis illustrates why a single crystal spring of the present invention is stronger than conventionally produced springs. One of the main limitations in maufacturing springs with conventional techniques is the unworkability of the materials into springs with acceptable spring characteristics. A single crystal spring is not limited by this problem, and, as a result, materials such as Mar–M–200 with a shear modulus of approximately $8.15 \times 10^6$ p.s.i. may be used. This is significantly lower than the shear modulus of conventional spring material, such as Inconel X, which is approximately $10.4 \times 10^6$ p.s.i.

As a result, if the springs from Example I are considered, it is clear that the Inconel X spring has a higher shear modulus than the single crystal spring. Therefore, based on the formula;

$$d^4 = K \frac{64nR^3}{G}$$

Where:
$d$=diameter of wire
$R$=radius of spring
$K$=force constant
$G$=sear modulus it will be noted that the lower the shear modulus, the greater the wire diameter $d$.

It is also known that the maximum shear stress on a spring results from two factors, the torsional shearing stress which occurs at the inside fibers of the spring and the direct shear stress caused by the axial loading; these two factors being additive. The maximum allowable shear stress is given by the formula:

$$S_{mx} = 16 \frac{PR}{\pi d^3} + \frac{4P}{\pi d^2}$$

It can therefore be seen that the greater the wire diameter $d$, the lower the maximum stress. Combining this with the considerations as to shear modulus makes it clear that a single crystal spring when compared to a substantially polycrystalline spring is much stronger.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:
1. A new article of manufacture comprising a single crystal cast resilient member having a predetermined crystallographic orientation with respect to the principal stress axis of the resilient member.
2. A new article of manufacture as in claim 1 wherein: the resilient member is cast from a high temperature metal of a nickel or cobalt base.
3. A new article of manufacture as in claim 2 wherein. the metal has a recrystallization temperature in excess of 1400° F.
4. A new article of manufacture comprising a spring element consisting of a single crystal of metal, this single crystal comprising a cast structure having a predetermined crystallographic orientation with respect to the principal stress axis of the spring element.
5. A new article of manufacture as in claim 4 wherein: the spring element is a helix of metal in single crystal form.
6. A new article of manufacture as in claim 4 wherein; the spring element consists of a single crystal of a high temperature metal of a nickel or cobalt base.
7. A new article of manufacture as in claim 6 wherein; the metal has a recrystallization temperature in excess of 1400° F., and the spring element is creep resistant up to a temperature of at least 1400° F.
8. A new article of manufacture comprising a spring element consisting of a single crystal of metal, this single crystal comprising a cast structure having a preferred crystallographic orientation, the crystallographic orientation being substantially parallel to the major axis of the spring element.
9. A new article of manufacture as in claim 8 wherein; the spring element is a helix of metal in single crystal form.
10. A new article of manufacture as in claim 8 wherein;
the spring element consists of a single crystal of a high temperature metal of a nickel or cobalt base.
11. A new article of manufacture as in claim 10 wherein;
the metal has a recrystallization to retain the temperature in excess of 1400° F. and the spring element is creep resistant up to a temperature of at least 1400° F.
12. A new article of manufacture comprising a spring element consisting of a single crystal of metal, this single crystal comprising a cast structure having a preferred crystallographic orientation being substantially along the [100] axis and parallel to the major axis of the spring element.
13. A new article of manufacture as in claim 12 wherein;
the spring element is a helix of metal in single crystal form.
14. A new article of manufacture as in claim 12 wherein;
the spring element consists of a single crystal of a high temperature metal of a nickel or cobalt base.
15. A new article of manufacture as in claim 14 wherein;
the metal has a recrystallization temperature in excess of 1400° F. and the spring element is creep resistant up to a temperature of at least 1400° F.

References Cited

UNITED STATES PATENTS 3,084,926   4/1963   Lemelson _____ 267—1

FOREIGN PATENTS 1,154,949   9/1963   Germany.

JAMES B. MARBERT, Primary Examiner